(12) United States Patent
Hornung et al.

(10) Patent No.: US 12,242,385 B2
(45) Date of Patent: Mar. 4, 2025

(54) VIRTUAL ADDRESSES FOR A MEMORY SYSTEM

(71) Applicant: Micron Technology, Inc., Boise, ID (US)

(72) Inventors: Bryan Hornung, Plano, TX (US); Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 326 days.

(21) Appl. No.: 17/647,579

(22) Filed: Jan. 10, 2022

(65) Prior Publication Data

US 2022/0292026 A1    Sep. 15, 2022

Related U.S. Application Data

(60) Provisional application No. 63/160,607, filed on Mar. 12, 2021.

(51) Int. Cl.
*G06F 12/10* (2016.01)

(52) U.S. Cl.
CPC ........ *G06F 12/10* (2013.01); *G06F 2212/657* (2013.01)

(58) Field of Classification Search
CPC .... G06F 12/10; G06F 12/0246; G06F 12/109; G06F 2212/7201; G06F 12/1009; G06F 3/0647; G06F 2212/657; G06F 2212/1016; G06F 3/0662; G06F 12/1441; G06F 16/188; G06F 3/0638; G06F 12/0815
USPC ...... 711/154, 12.058, 203, 103, 202, 12.001, 711/12.002, 12.016, 12.068, 12.061, 711/12.026, 141, 12.008, 111, 114
See application file for complete search history.

(56) References Cited

U.S. PATENT DOCUMENTS

| | | | |
|---|---|---|---|
| 6,594,712 B1 | 7/2003 | Pettey et al. | |
| 7,907,604 B2 | 3/2011 | Boyd et al. | |
| 11,121,956 B1* | 9/2021 | Sebastian | ................ H04L 43/04 |
| 2011/0072234 A1 | 3/2011 | Chinya et al. | |
| 2014/0025770 A1* | 1/2014 | Warfield | ................ G06F 16/256 |
| | | | 709/213 |
| 2014/0376548 A1 | 12/2014 | Naven et al. | |
| 2015/0067295 A1* | 3/2015 | Storm | ................ G06F 16/2365 |
| | | | 711/171 |
| 2018/0267821 A1* | 9/2018 | Kurichiyath | ............ G06F 12/10 |

(Continued)

OTHER PUBLICATIONS

"International Search Report and Written Opinion of the International Searching Authority," issued in connection with Int'l Appl. No. PCT/US22/70141 dated May 3, 2022 (10 pages).

*Primary Examiner* — Yaima Rigol
*Assistant Examiner* — Edward Waddy, Jr.
(74) *Attorney, Agent, or Firm* — Holland & Hart LLP

(57) ABSTRACT

Methods, systems, and devices for virtual addresses for a memory system are described. In some examples, a virtual address space may be shared across a plurality of memory devices that are included in one or more domains. The memory devices may be able to communicate with each other directly. For example, a first memory device may be configured to generate a data packet that includes an identifier and an address that is included in the shared virtual address space. The data packet may be transmitted to a second memory device based on the identifier, and the second memory device may access a physical address based on the address.

16 Claims, 10 Drawing Sheets

(56) References Cited

U.S. PATENT DOCUMENTS

2020/0026461 A1   1/2020  Tune
2020/0250080 A1*  8/2020  Yao .......................... G06F 3/067

* cited by examiner

VIRTUAL ADDRESSES FOR A MEMORY SYSTEM

CROSS REFERENCE

The present application for patent claims the benefit of U.S. Provisional Patent Application No. 63/160,607 by HORNUNG et al., entitled "VIRTUAL ADDRESSES FOR A MEMORY SYSTEM," filed Mar. 12, 2021, assigned to the assignee hereof, and expressly incorporated by reference herein.

FIELD OF TECHNOLOGY

The following relates generally to one or more systems for memory and more specifically to virtual addresses for a memory system.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAIVI), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Some interfaces (e.g., the Compute Express Link (CXL) interface) are designed to be used between a host system and one or more memory systems. For example, the memory systems may use memory coherently across the host system and memory system. Thus, the CXL interface is directed to a single-host domain and host managed control of coherency of a single memory system. Due to a host managing coherency for a single domain, the amount (e.g., the quantity) of memory accessible may be limited by the memory devices included in the domain. For example, the host may have access to 16 GB worth of memory that is included in the single-host domain. In some instances, however, it may be desirable to utilize a global address space across multiple memory systems (e.g., across multiple domains) in order to provide larger accessible address spaces for memory access requests. In addition, it may be beneficial to allow multiple operating system (OS) domains to interact via a shared address space.

A system that allows virtual addresses to be used over CXL and between domains (e.g., OS domains) is described herein. For example, system may implement a global virtual address space that is associated with one or more memory systems. A data packet may be generated, using particular fields, to access different virtual addresses that may be located in different domains. In some examples, the data packet may include a destination ID that may be used for communication between CXL devices without host interaction. For example, the data packets may be communicated from device-to-device via one or more switches that are part of one or more host systems. The data packets may be switched between devices within the same OS domain (e.g., devices associated with a same host system) using the destination IDs, or packets may be communicated between CXL devices in different OS domains (e.g., via switches for each domain). Utilizing the global address space across multiple memory systems may provide flexibility to the overall system, as well as larger accessible address spaces for memory access requests. Moreover, utilizing device IDs may allow for address translations to be performed on a per-device basis, thus reducing the quantity of address translations any one CXL device may need to perform.

Figure 1:
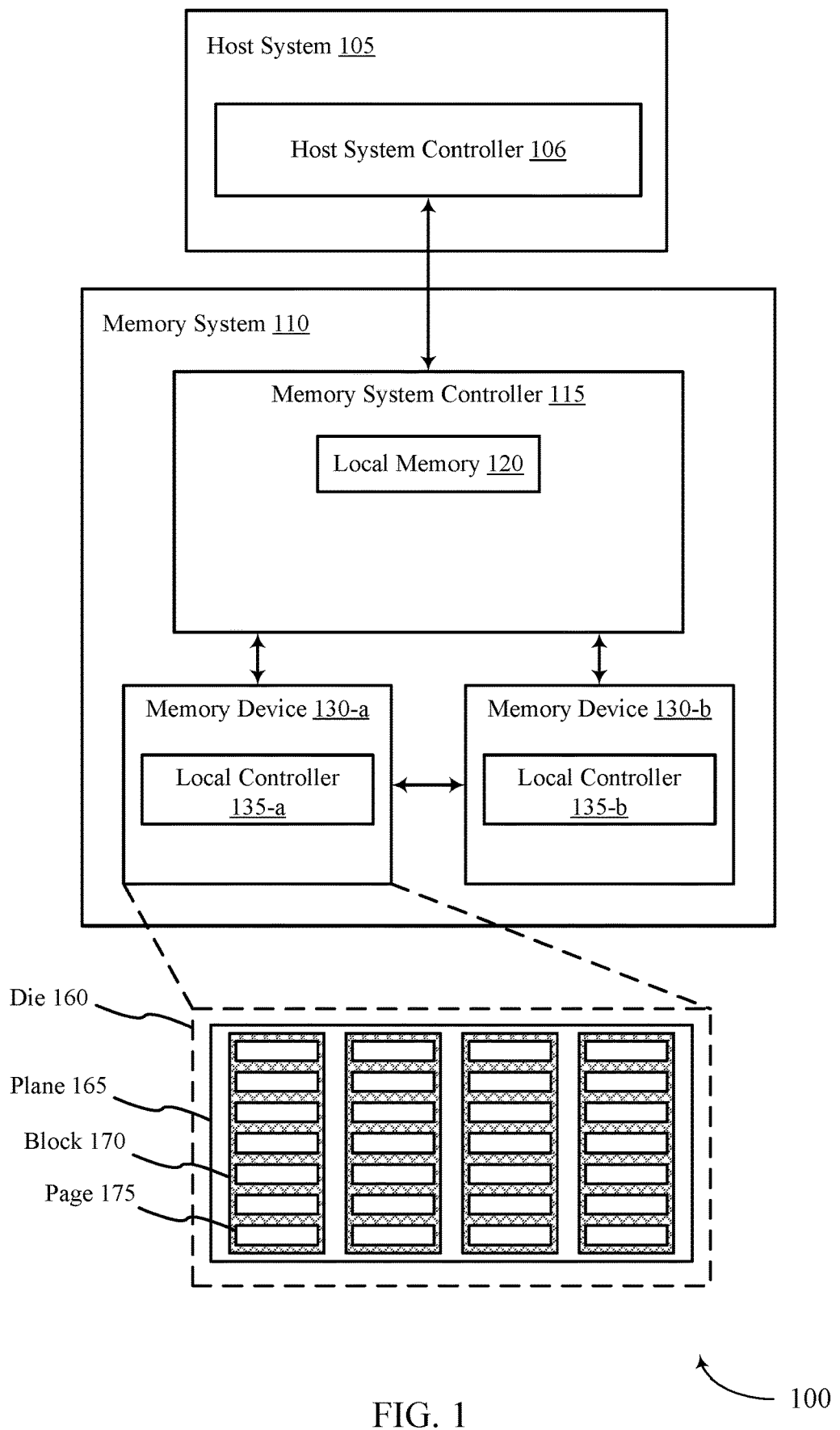
FIG. 1 illustrates an example of a system that supports virtual addresses for a memory system in accordance with examples as disclosed herein.
Figure 2:
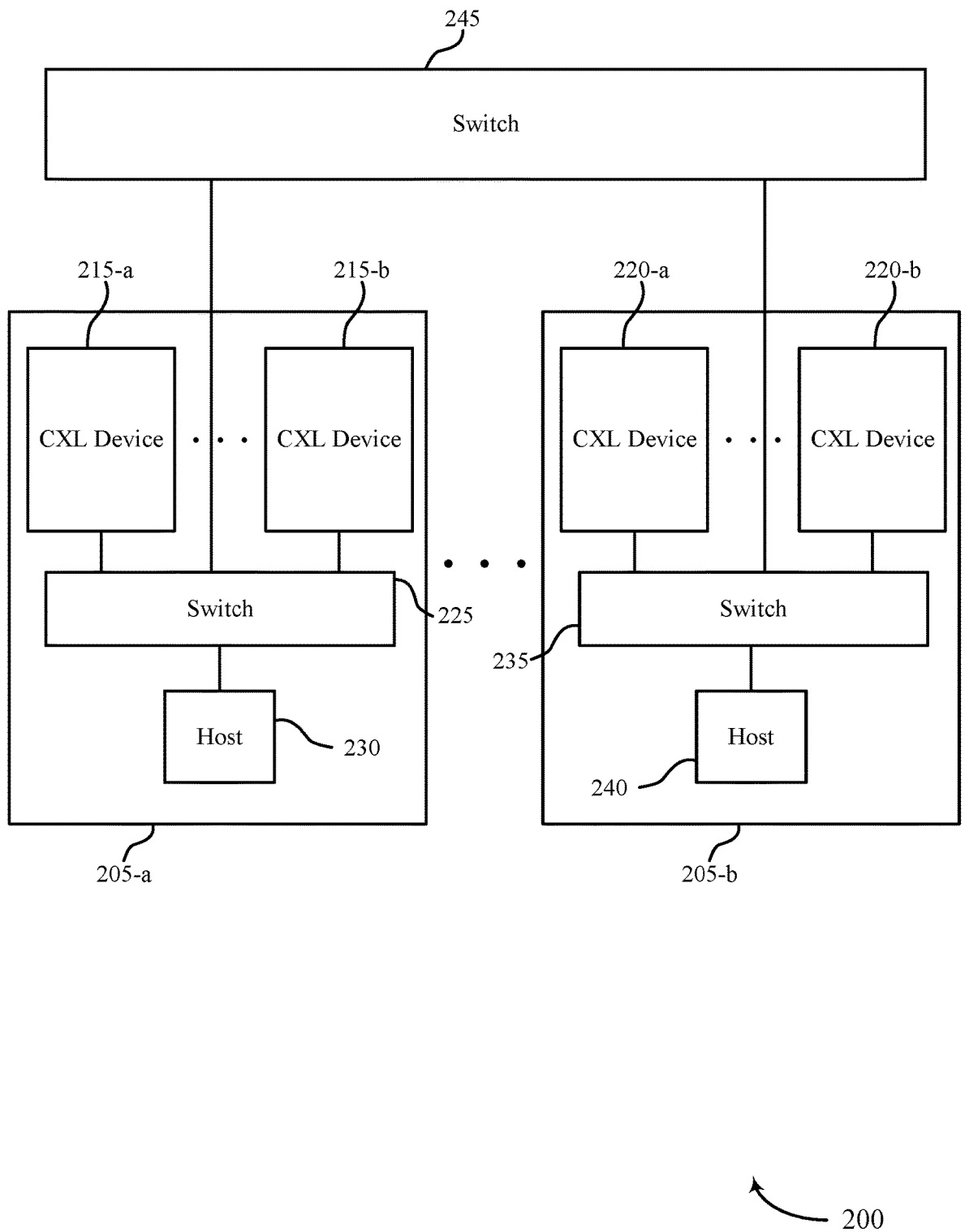
FIG. 2 illustrates an example of a system that supports virtual addresses for a memory system in accordance with examples as disclosed herein.

Features of the disclosure are initially described in the context of systems with reference to FIGS. 1 through 2. Features of the disclosure are described in the context of block diagrams and process flow diagrams with reference to FIGS. 3 and 4. These and other features of the disclosure are further illustrated by and described in the context of an apparatus diagram and flowchart that relate to virtual addresses for a memory system with reference to FIGS. 5-10.

FIG. 1 illustrates an example of a system 100 that supports virtual addresses for a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), a Low Power Double Data Rate (LPDDR) interface, and a CXL interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device, though other types of managed memory devices are supported. For example, a managed memory device may include any type or quantity of volatile or non-volatile memory devices.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support virtual addresses for a memory system. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, a virtual address space may exist across a portion (or all) of the memory system 110. For example, the memory system 110 may include one or more memory devices that are configured to communicate with each other directly. The memory devices may each include a memory management unit (MMU) or a processor configured to perform operations on the memory. The MMU or processor of each memory device may be configured to generate a data packet to be transmitted from device-to-device.

The data packet may include a plurality of fields. In some examples, a first field may include an identifier of a receiving memory device (e.g., a memory device the data packet is being transmitted to) and a second field may include a virtual address. The address may be located within the range of the shared virtual address space. By way of example, the a MMU or processor of a first memory device (e.g., a transmitting memory device) may generate a data packet that includes a first field that identifies a second memory device (e.g., a receiving memory device). Moreover, the data packet may include a virtual address that is located within a virtual address space that is shared between the first memory device and the second memory device.

The MMU or processor of the first memory device may be configured to transmit the data packet to the second memory device, and the MMU, a controller, or a processor of the second memory device may access a physical address based on the virtual address included in the second field. That is, the MMU, controller, or processor of the second memory device may translate the virtual address to a physical address based on a local address translation table. In some instances, the virtual address may be translated to a physical address and in other examples, the virtual address may be translated to a logical address, which may be translated to the physical address/Thus, the memory devices included in the memory system 110 may be able to communicate with each other without involvement by the host system 105, thus providing the memory system 110 added flexibility for handling memory access requests, while reducing latency that would otherwise be incurred during an access operation due to involvement by the host system 105.

FIG. 2 illustrates an example of a system 200 that supports virtual addresses for a memory system in accordance with examples as disclosed herein. The system 200 may be an example of a system 100 as described with reference to FIG. 1 or aspects thereof. The system 200 may include a first memory domain 205-a and a second memory domain 205-b. Each memory domain may include one or more memory devices (such as CXL device 215-a), one or more switches (such as switch 225), and a respective host system (such as host system 230). In some examples, the system 200 may implement aspects of the system 100 as described with reference to FIG. 1. For example, memory device 215-a may be an example of a device included in the memory system 110 and the host system 230 may be an example of the host system 105 as described with reference to FIG. 1.

In some examples, the system 200 may include a first memory domain 205-a, which may also be referred to as a first OS domain 205-a. The first memory domain 205-a may include or may be associated with one or more memory devices 215, which may be CXL memory devices 215. For example, one or more of the memory devices 215 may include device memory, a controller, and a processing unit (not shown) and may be configured to interface with the host system 230 and other CXL memory devices 215 via the switch 225. Additionally or alternatively, the system 200 may include a second memory domain 205-n, which may be referred to as a second OS domain 205-b. The second memory domain 205-b may include or may be associated with one or more memory devices 220, which may be CXL memory devices 220. For example, each memory device 220 may include device memory, a controller, and a processing unit (not shown) and may be configured to interface with the host system 240 via the switch 235.

Although the first memory domain 205-a and the second memory domain 205-b are illustrated as including two memory devices (e.g., memory devices 215 and memory devices 220), the first memory domain 205-a and the second memory domain 205-b may include any quantity of memory devices. Moreover, the system 200 may include any quantity of domains. The memory devices within each domain may communicate with a respective host device via a switch (or, in some instances, via more than one switch). Additionally or alternatively, the switch (or switches) of each domain may communicate with each other directly or via a switch (e.g., via a top-of-rack switch). For example, the switch 225 may communicate with the switch 235 directly (not shown) or via the top-of-rack switch 245.

In some instances the switches may include logic or other processing capabilities in order to communicate with each other. For example, the switch 225 may include logic to determine whether to route a data packet to the switch 245 or to a memory device included in the first memory domain 205-a. Moreover, the switch 245 may include logic or other processing capabilities to determine which domain to route a data packet to. Additionally or alternatively, the switch 225 may include logic to determine whether to route a data packet to the switch 245 or to a memory device included in the second memory domain 205-b. Accordingly, the memory devices 215 may communicate with the memory devices 220 via the switch 225, the switch 235, and the top-of-rack switch 245.

In some examples, the switch 225 and the switch 235 may each include a plurality of ports. Each port may be coupled with a memory device (e.g., a memory device 215-a), a host system (e.g., a host system 230), or another component. In some instances, the ports on a single switch may be coupled with various domains. Thus, although the switch 225 is illustrated as being included in and coupled with components in the first memory domain 205-a, the switch 225 may include one or more ports coupled with devices, components, or systems located in a different domain (or domains). Similarly, although the switch 235 is illustrated as being included in and coupled with components in the first memory domain 205-b, the switch 235 may include one or more ports coupled with devices, components, or systems located in a different domain (or domains)

In some instances, the processing units and controllers of the respective memory devices 215 may be a single logic component formed on a same field programmable gate array (FPGA) or application-specific integrated circuit (ASIC). However, in some examples, the controller and processing unit may be individual components. For example, the processing unit may be a graphics processing unit (GPU) or general-purpose graphics processing unit (GPGPU). The processing unit may be configured to transmit signaling and/or commands to the controller for accessing the device memory. As described herein, the processing unit may be configured to generate a data packet that can be transmitted directly to another memory device within the system 200 without interaction by a respective host system.

In some instances, the device memory of each memory device (e.g., of each memory device 215 or of each memory device 220) may be configured to store data transferred between the respective memory device and host system, e.g., in response to receiving access commands from the respective host system, as described herein. The memory devices may include one or more memory devices as described with reference to FIG. 1. For example, the memory devices may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

Moreover, the controller or processing unit of each memory device (e.g., of each memory device 215 or of each memory device 220) may control the passing of data directly to and from the respective memory device, e.g., for storing data, retrieving data, and determining memory locations in which to store data and from which to retrieve data. The controller or processing unit may communicate with the device memory of the respective memory device directly or via a bus using a protocol specific to each type of memory device. In some cases, a single controller may be implemented for each memory device, while in other examples some of the memory devices may include multiple controllers. In some cases, a respective controller may implement aspects of a memory system controller 115 as described with reference to FIG. 1.

The controller or processing unit of each memory device may additionally be configured for operations associated with the respective memory device. For example, the controller or processing unit may execute or manage operations such as wear-leveling operations, garbage collection operations, error control operations such as error-detecting operations or error-correcting operations, encryption operations, caching operations, media management operations, background refresh, health monitoring, and address translations. For example, the controller or processing unit may translate virtual addresses to physical addresses, or may translate virtual addresses to logical addresses (e.g., LBAs), which may be translated to physical addresses (e.g., physical block addresses) associated with memory cells within the memory device.

In some examples, the device memory for each memory device may be configured to store data that is accessible by the respective processing unit (e.g., via the controller of the respective memory device) and the respective host device. Because the data is accessible by both the processing unit and the host device (e.g., the data is shared), it may be desirable for coherency of the data to be tracked. That is, it may be desirable for both the processing unit and the host device to know whether data in the device memory (or a cache of the respective memory device) is coherent with corresponding data (for the same address) that was transmitted to the host device. Such coherency may be referred to as device coherency.

In other examples, an access operation may be performed (e.g., at the memory device 220-*a*) based on receiving a data packet from another memory device (e.g., the memory device 215-*a*). In such instances, the data may or may not be coherent since device coherency is tracked on a per-domain basis. This coherency may be referred to as I/O coherency, where the data is read as coherent at the time of access. That is, host systems may not track whether data associated with other domains is coherent, but the data may be still be accessed. However, upon accessing the data, the host system associated with the receiving device (e.g., the host system 240) may be notified to recall the data (e.g., to retrieve or send a modified version of the data).

By way of example, a shared virtual address space may exist across at least a portion of the memory device 215-*a*, the memory device 215-*b*, the memory device 220-*a*, and the memory device 220-*b*. A physical address of a respective memory device may be accessed based on one or more fields included in a data packet. For example, the controller or processing unit of the memory device 215-*a* may generate a data packet for accessing a portion of the virtual address space associated with the memory device 220-*b*. The data packet may include a first field for identifying the memory device 220-*b* as the receiving memory device. The data packet may include a second field that includes an address (e.g., a virtual address). As described herein, the shared virtual address space may include a range of addresses. For example, the virtual address space may be allocated across one or more memory devices, such as the memory devices 215-*a*, 215-*b*, 220-*a*, and 220-*b*. Each memory device may be associated with a given range of the virtual address space. Upon generating the data packet, the memory device 215-*a* (e.g., the controller or processing unit of the memory device 215-*a*) may transmit the packet to the memory device 220-*b*.

In some instances, the data packet may be transmitted via the switch 225, the switch 245, and the switch 235. That is, the data packet may be routed to the memory device 220-*b* using the switch coupled with the transmitting memory device 215-*a* (e.g., the switch 225), the top-of-rack switch 245, and the switch coupled with the receiving memory device 220-*b* (e.g., the switch 235). As used herein, "routing" may refer to a process where a header field associated with a specific device is used to direct a packet to a destination. That is, a switch (e.g., a switch 225, a switch 245) may be configured (e.g., by a host system 230, a host system 240) with specific correspondence between device identifiers and IDs and ports (e.g., ports of the switch). Thus, a switch may direct packets to the corresponding ports based on the destination field in the packet. Accordingly, the terms "routing" and "switching" may be used interchangeably herein.

Upon receiving the data packet, the memory device 220-*b* (e.g., the controller or processing unit of the memory device 220-*b*) may perform an address translation on the address (e.g., the virtual address) to determine a physical address to access. Because the physical address is associated with the device memory of the memory device 220-*b*, the controller may be responsible for performing address translations only on the memory device 220-*b*. That is, the controller of the memory device 220-*b* may not need to perform an address translation on a virtual address that is associated with any other memory device.

Moreover, upon performing an access operation on the physical address of the memory device 220-*b*, the controller may transmit an indication to the host system 240 to recall the data stored to the host system 240. That is, the controller may transmit an indication to notify the host system 240 that the data has been accessed and a modified version should be retrieved or sent. By utilizing a device identifier field in a data packet, the system 200 may be provided with added flexibility for handling memory access requests, while reducing latency that would otherwise be incurred during an access operation due to involvement by a respective host system.

Figure 3:
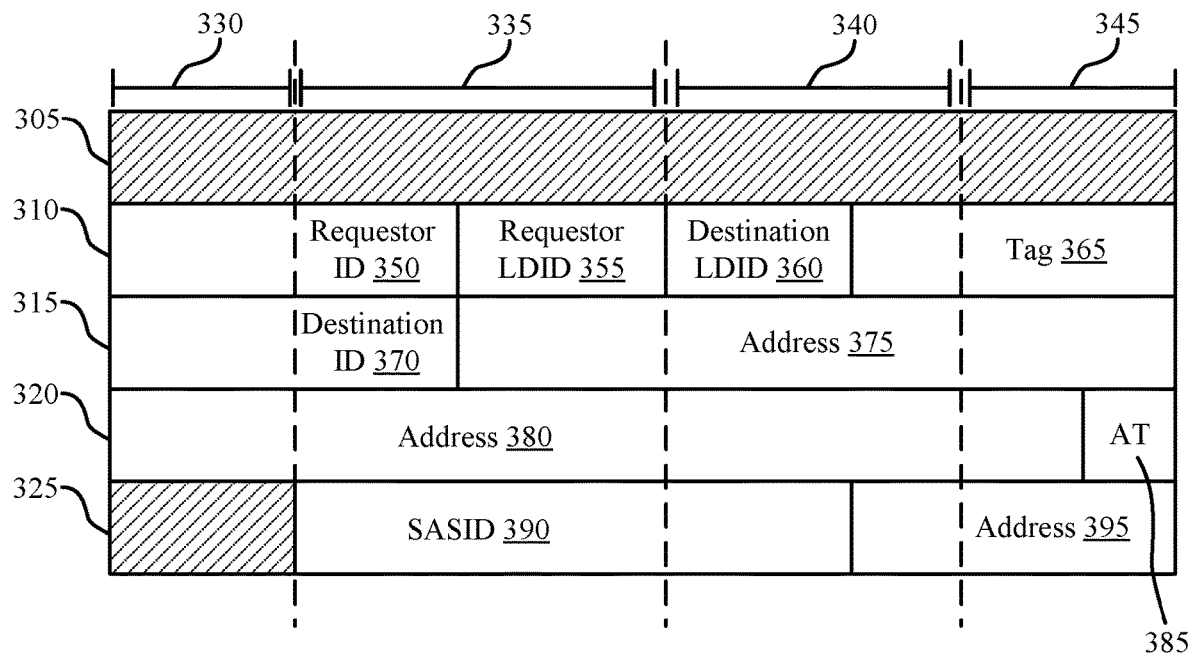
FIG. 3 illustrates an example of a block diagram of a data packet that supports virtual addresses for a memory system in accordance with examples as disclosed herein.

FIG. 3 illustrates an example of a block diagram 300 of a data packet that supports virtual addresses for a memory system in accordance with examples as disclosed herein. The block diagram 300 of the data packet may illustrate various fields that may be included in a data packet that is configured to be transmitted from one memory device (e.g., a first CXL memory device) to another memory device (e.g., a second CXL memory device).

For example, the block diagram 300 may illustrate one or more fields included in a first portion 305, a second portion 310, a third portion 315, a fourth portion 320, and a fifth portion 325 of a data packet. Each portion may represent a quantity of bytes of data. Additionally or alternatively, the block diagram 300 may illustrate a first subset 330, a second subset 335, a third subset 340, and a fourth subset 345 of the portions of the data packet. Each subset may represent a quantity of bits of each byte of data. For example, each portion may represent four (4) bytes, and each subset may represent eight (8) bits of data. The fields included in the data packet illustrated by the block diagram 300 may allow for shared virtual addressing with device identifier based switching. By utilizing a device identifier field in a data packet as described herein, the system (e.g., the system 200 as described with reference to FIG. 2) may be provided with added flexibility for handling memory access requests, while reducing latency that would otherwise be incurred during an access operation due to involvement by a respective host system.

In some examples, the first portion 305 of the data packet may include one or more fields that are specified by and defined in the CXL specification. For example, the first portion 305 may include one or more of the following fields: Type, TC, OHC, TS, ATTR, and Length. The purposes and sizes (e.g., lengths) of these fields may be defined in the CXL specification and, in some instances, may be omitted from the data packet described herein. Whether the fields are included in the data packet, and the sizes (e.g., lengths) of each field may be a matter of design choice based on other fields as described herein. For example, one or more of the fields included in the first portion 305 may be omitted, or the size (e.g., length) of one or more of the fields included in the first portion 305 may be changed relative to the CXL specification based on other fields included in the data packet.

The second portion 310 of the data packet may include a Requestor ID field 350. The Requestor ID field 350 may be associated with an identifier of a physical device included in a memory system. In some instances, the purpose of the Requestor ID field 350 may be different than as specified by and defined in the CXL specification. For example, the CXL specification may specify that the Requestor ID field 350 may be associated with a virtual entity (e.g., a process ID, an application ID). Moreover, the CXL specification may specify that the Requestor ID field 350 is to be sixteen (16) bits long. As illustrated in FIG. 3, the Requestor ID field 350 may be modified to be twelve (12) bits long, although the size of the field may be modified. In other instances, whether the field is included in the data packet, and the size (e.g., length) the field may be a matter of design choice based on other fields as described herein.

A portion of the second subset 335 of the second portion 310 of the data packet may include a field that corresponds to a requestor logical device identifier (e.g., a Requestor LDID) field 355. As illustrated in FIG. 3, the Requestor LDID field 355 may be four (4) bits long. In some instances, the memory devices described with reference to FIG. 2 (e.g., the memory device 215-a) may include one or more logical devices. That is, each memory device may include one or more logical devices that may be used for different processes. The processes may be associated with one or more host domains that run the processes. In some examples, processes running on the host domains could be associated with different applications (e.g., different types of applications).

For example, the memory device 215-a may include a first logical device that is associated with a first process or first type of processes (e.g., graphics processing), and a second logical device that is associated with a second process or a second type of processes (e.g., network interfacing). In some instances, logical devices may be associated with different host domains. For example, a single memory device may include a plurality of logical deices. Each logical device may be associated with a same host domain, a different (e.g., a respective) host domain, or some logical devices may be associated with a same host domain and other logical devices may be associated with a different host domain (or domains). Thus when logical devices are implemented in a system, the data packet may include a Requestor LDID field 355.

The third subset 340 of the second portion 310 of the data packet may include a field that corresponds to a destination logical device identifier (e.g., a Destination LDID) field 360. As illustrated in FIG. 3, the Destination LDID field 360 may be four (4) bits long. In some instances, the memory devices described with reference to FIG. 2 (e.g., the memory device 215-a) may include one or more logical devices. That is, each memory device may include one or more logical devices that may be used for different processes (e.g., that are assigned to different host domains). For example, the memory device 215-a may include a first logical device that is associated with a first process or first type of processes (e.g., graphics processing), and a second logical device that is associated with a second process or a second type of processes (e.g., network interfacing). When logical devices are implemented in a system, the data packet may include a Destination LDID field 360 to ensure that the receiving device (e.g., the receiving memory device) accesses a physical address associated with the logical device.

The second portion 310 of the data packet may include a field that is specified by and defined in the CXL specification. For example, a portion of the third subset 340 and the fourth subset 345 of the second portion 310 may include a Tag field 365. As illustrated in FIG. 3, the Tag field 365 may be twelve (12) bits long. The purpose and size (e.g., length) of the Tag field 365 may be defined in the CXL specification and, in some instances, may be omitted from the data packet described herein. In other instances, the length of the Tag field 365 relative to the CXL specification may be altered (e.g., lengthened or shortened) to account for the Requestor LDID field 355 and Destination LDID field 360. Thus, whether the Tag field 365 is included in the data packet, and the size (e.g., length) of the Tag field 365 may be a matter of design choice based on other fields as described herein.

The third portion 315 of the data packet may include a Destination ID field 370 that indicates a device (e.g., a receiving memory device) to transmit the data packet to. For example, the first subset 330 and a portion of the second subset 335 of the third portion 315 may include the Destination ID field 370, which may be twelve (12) bits long and may be associated with a device ID.

In some instances, a value represented by the bits included in the Destination ID field 370 may correspond to a memory device (e.g., a memory device 215-*a* as described with reference to FIG. 2) included in a memory system. Moreover, the memory devices associated with a shared address space across a system (e.g., each memory device across connected domains) may be associated with a respective range of addresses. Accordingly, a device ID may be redundant with a range of virtual addresses, but may allow for the data packet to be transmitted from device-to-device within the memory system. In some instances, a transmitting memory device may be included in a same domain as a receiving memory device the memory packet, or the memory devices may be included in different domains.

In some examples, different switches within the system may include ports (e.g., input ports, output ports, bi-directional ports) that are configured to route the data packet to a memory device based on the Destination ID field 370. For example, as described with reference to FIG. 2, the memory device 215-*a* may generate a data packet having a Destination ID field 370. A value represented by the bits included in the Destination ID field 370 may indicate that the data packet is to be transmitted to the memory device 220-*b*. Accordingly, the switch 225, the top-of-rack switch 245, and the switch 235 may include logic (or other processing capabilities) that are configured to route the data packet to the memory device 220-*b* based on the Destination ID field 370. In other examples, the switches may include logic to route the data packet to a switch of the correct domain (e.g., a domain associated with the receiving memory device), and the switch included in the domain may include logic to route the data packet to the correct memory device.

The third portion 315 of the data packet may also include a portion of an address field 375. For example, a portion of the second subset 335, the third subset 340, and the fourth subset 345 may include a portion of the address field 375, which may be twenty (20) bits long and may correspond to a portion of a virtual address that is within a range of a shared virtual address space of a memory system. The address field 375 may correspond to a portion of a virtual address when transmitting a data packet to a different host domain. For example, as described with reference to FIG. 2, an address field 375 of a data packet may include a virtual address when the data packet is transmitted from the memory device 215-*a* to the memory device 220-*a*. Additionally or alternatively, the address field 375 may correspond to a portion of a physical address when the data packet is transmitted from the memory device 215-*a* to the memory device 215-*b*.

In other examples, the address field 375 may correspond to a physical address when transmitting a data packet within a same host domain. For example, as described with reference to FIG. 2, an address field 375 of a data packet may include a physical address when the data packet is transmitted from the memory device 215-*a* to the memory device 215-*b*. Thus, when the data packet is received at the memory device 215-*b*, a controller or other component of the memory device 215-*b* may access the physical address directly (e.g., without performing an address translation).

Additionally or alternatively, the first subset 330, second subset 335, third subset 340, and a portion of the fourth subset 345 of the fourth portion 320 of the data packet may also include the address field 380. Accordingly, the address field may be fifty (50) bits in total. A value represented by the bits included in the address fields (e.g., 375 and 380) may indicate a virtual address of the memory device (e.g., the memory device indicated by the Destination ID field 370).

The memory device (e.g., the receiving memory device) may determine a physical address based on the bits indicating the virtual address. As described herein, the receiving memory device may be included in a same domain as the memory device generating and transmitting the memory packet, or the memory device may be included in a different domain.

In some examples, different switches within the system may include ports (e.g., input ports, output ports, bi-directional ports) that are configured to route the data packet to a memory device based on the Destination ID field 370. For example, as described with reference to FIG. 2, the memory device 215-*a* may generate a data packet having an address field. The data packet may be routed to a switch included in the correct domain (e.g., a domain associated with the receiving memory device) based on the Destination ID field 370. In other examples, a switch included in the receiving domain may include logic (or other processing capabilities) that is configured to route the data packet to the correct memory device based on the address fields (e.g., 375 and 380) or Destination ID field 370. For example, different ports on the switch may be associated with different ranges of physical addresses or different device IDs. Accordingly, the switch may route the data packet to the receiving memory device based on a value associated with the address field or based on the device ID of the receiving memory device.

A portion of the fourth subset 345 of the fourth portion 320 of the data packet may include a field that corresponds to an AT field 385. As illustrated in FIG. 3, the AT field 385 may be two (2) bits long. The purpose and size (e.g., length) of this field may be defined in the CXL specification and, in some instances, may be omitted from the data packet described herein. In other instances, the field may be included in the address field as described herein. That is, the address field may include fifty-two (52) bits instead of fifty (50) as previously described. Whether the field is included in the data packet, and the size (e.g., length) the field may be a matter of design choice based on other fields as described herein.

The fifth portion 325 of the data packet, which may be referred to as an orthogonal header 325, may be an optional portion. In some instances, a shared address space may be so large that the address fields included in the third portion 315 and the fourth portion 320 may not be large enough to indicate a virtual address. For example, a global virtual address space may exist across domains that uses the bits of an additional address field included in the fifth portion 325 of the data packet. The additional address bits may be used in addition to the fifty two (52) address bits included in the third portion 315 and the fourth portion 320. In such instances, the fifth portion 325 may be included in the data packet, and may include a field that is specified by and defined in the CXL specification. For example, the first subset 330 of the fifth portion 325 may include one or more R (e.g., reserved) and or SV (e.g., SASID valid) fields. As illustrated in FIG. 3, the fields may be eight (8) bits long.

The purpose and size (e.g., length) of these fields may be defined in the CXL specification and, in some instances, may be omitted from the data packet described herein. In some instances, a reserved (e.g., R) field may be reserved and thus defined at a later time or during another process. A SV field may indicate (e.g., a value of the SV field may indicate) that a SASID field is valid and that the address included in the data packet is a virtual address. In other instances, whether the fields are included in the data packet, and the size (e.g., length) of the fields may be a matter of design choice based on other fields as described herein.

The fifth portion 325 of the data packet may include a process identifier field (e.g., a SASID field 390). For example, the second subset 335 and a portion of the third subset 340 of the fifth portion 325 may include the SASID field 390, which may be twelve (12) bits long. As described herein, different processes (e.g., graphics processing, network interfacing, etc.) may be associated with respective virtual address spaces. Accordingly, the SASID field 390 may indicate a shared address space associated with the data packet, which may allow for the receiving memory device to access a correct physical address. For example, a process associated with the data packet may be determined at the destination (e.g., the destination memory device) by mapping a value associated with the SASID field 390 to a process using a table or other data accessible by the destination memory device. In some examples, two processes may be associated with virtual addresses that overlap in the range of addresses they cover. Based on the SASID field 390, the receiving memory device may access a different physical address based on a value indicated by the bits in the SASID field 390.

The fifth portion 325 of the data packet may also include an address field 395. For example, a portion of the third subset 340 and the fourth subset 345 of the fifth portion 325 may include the address field 395, which may be twelve (12) bits long. As described herein, the address bits may be included as additional address bits to the fifty two (52) address bits included in the third portion 315 and the fourth portion 320. Accordingly, the additional address bits included in the fifth portion 325 may allow for an entire virtual address space to be accessed by the data packet. Moreover, the value indicated by the address field 395 in the fifth portion 325 may function in a similar manner (and in conjunction with) the address fields included in the third portion 315 and the fourth portion 320. Accordingly, the data packet represented by the block diagram 300 may include one or more fields that allow for routing between different memory devices without host interaction.

Figure 4:
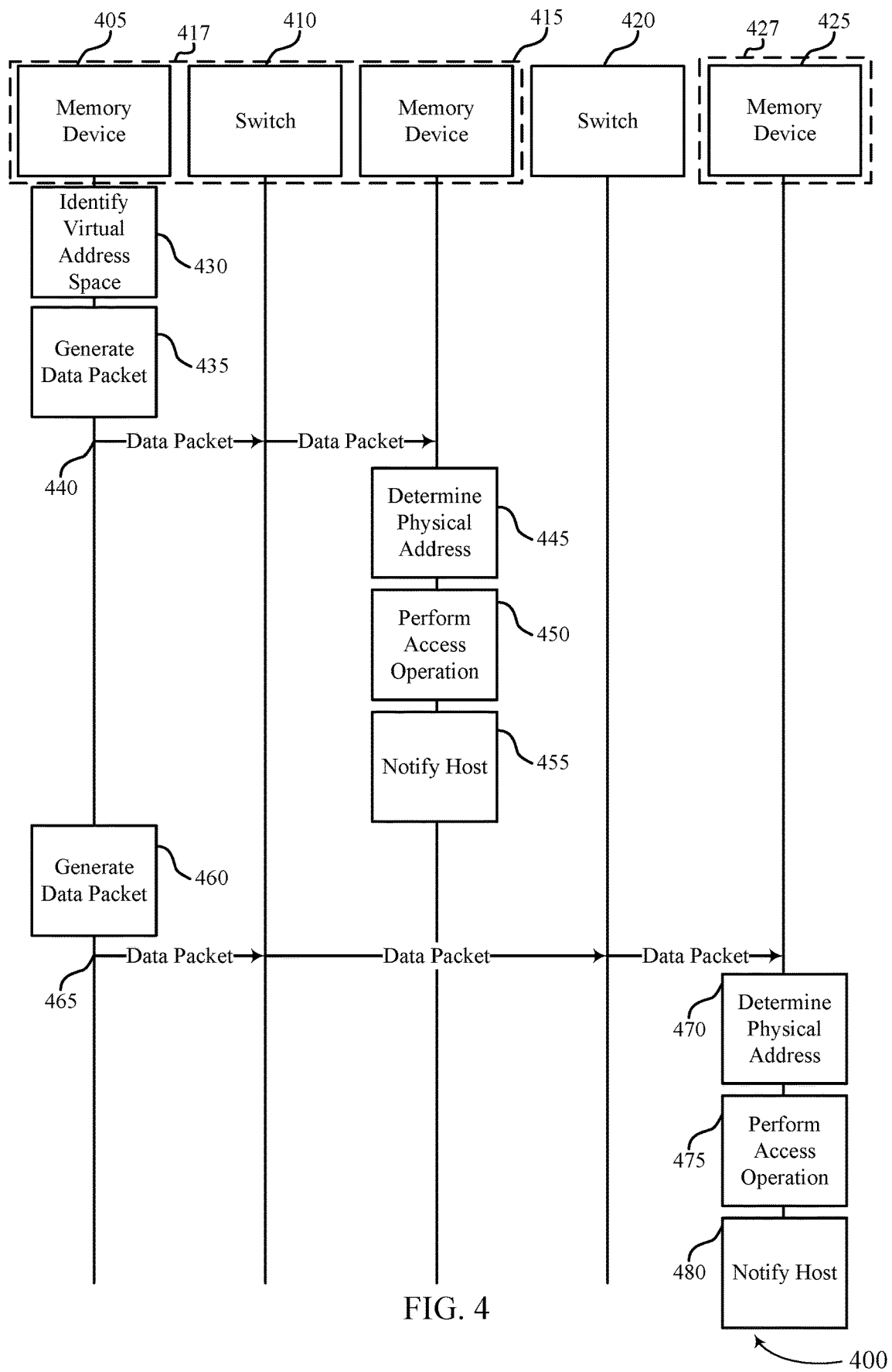
FIG. 4 illustrates an example of a process flow diagram that supports virtual addresses for a memory system in accordance with examples as disclosed herein.

FIG. 4 illustrates an example of a process flow diagram 400 that supports virtual addresses for a memory system in accordance with examples as disclosed herein. The process flow diagram may illustrate the operations of a first domain 417 (e.g., a first memory domain 417) and a second domain 427 (e.g., a second memory domain 427), which may be examples of the first memory domain 205-*a* and the second memory domain 205-*b* as described with reference to FIG. 2. The first domain 417 may include at least a first memory device 405 and a second memory device 415 that are each coupled with a switch 410 (e.g., a port of a switch 410). In some instances, the first memory device 405 and the second memory device 415 may each include a device memory, a controller, and a processing unit as described with reference to FIG. 2. Moreover, the second domain may include at least a third memory device 425 that includes a device memory, a controller, and a processing unit.

The first domain 417 and the second domain 427 may be coupled via a switch 420, which may be an example of a top-of-rack switch 245 as described with reference to FIG. 2. The process flow diagram may illustrate data packets being generated and transmitted based on a device ID, which may provide the associated system with added flexibility for handling memory access requests, while reducing latency that would otherwise be incurred during an access operation due to involvement by a respective host system.

At 430, the first memory device 405 may identify a virtual address space associated with a plurality of memory devices. For exemplary purposes only, the virtual address space may be shared by the first memory device 405, the second memory device 415, and the third memory device 425. However, in other examples, the virtual address space may be shared by any quantity of memory devices that are associated with any quantity of domains. In some instances, a controller or processing unit associated with the first memory device 405 may identify the virtual address space. The virtual address space may configure across the memory devices by a host system. For example, the host system may configure the shared address space, and may configure each memory device with a respective range of addresses of the shared address space. The first memory device 405 may thus be configured with a range of addresses included in the shared address space so that, when generating a data packet, the Destination ID field and/or the address field may correspond to a memory device and virtual address that are associated or within the shared virtual address space.

At 435, the first memory device 405 may generate a data packet (e.g., a first data packet) based on identifying the virtual address space (e.g., at 430). In some examples, the data packet may include one or more of the fields illustrated by the block diagram 300 as described with reference to FIG. 3. In some instances, a controller or processing unit associated with the first memory device 405 may generate the data packet. For exemplary purposes only, the first memory device 405 may generate at least the Destination ID and address fields such that the data packet can be routed to the desired destination memory device.

At 440, the first memory device 405 may transmit the data packet to a destination memory device. As described herein, the destination memory device may be indicated by the Destination ID field included in the data packet. In some instances, a controller or processing unit associated with the first memory device 405 may transmit the data packet. For exemplary purposes only, the Destination ID field of the data packet may include a value (e.g., bit value) that indicates the second memory device 415 as the destination memory device. In some instances, the switch 410 may include logic that identifies whether to route the data packet to another switch (e.g., switch 420) and/or another domain (e.g., second domain 427) or whether the data packet is associated with a memory device included in the same domain.

Additionally or alternatively, the switch 410 may include logic to determine which memory device to route the data packet to if the data packet is associated with a memory device included in the same domain. For example, the switch 410 may include a plurality of ports that are each associated with a destination ID (e.g., a device ID of one or more associated memory devices). The switch 410 may compare a value represented by the bits included in the Destination ID field included in the data packet to the range of device IDs associated with the switch 410 to determine which memory device to route the data packet to. As illustrated in FIG. 4, the switch 410 may determine that the address included in the data packet matches (e.g., is included in) a virtual address range associated with the second memory device 415.

At 445, the second memory device 415 may determine a physical address of its device memory that is associated with the virtual address included in the data packet. In some instances, a controller or processing unit associated with the second memory device 415 may determine the physical address. The second memory device 415 may include a table (e.g., a mapping table) or other logic configured to map the received virtual address to a physical address of its device memory.

In some instances, the table may include information regarding logical devices associated with the second memory device 415, such that if the data packet includes a Requestor LDID field 355 or a Destination LDID field 360, the second memory device 415 may determine the physical address associated with a particular logical device. Additionally or alternatively, the table may include information regarding mappings between processes and physical addresses, such that if the data packet includes a SASID field, the second memory device 415 may determine the physical address associated with a particular process. However, as described herein, the table used by the second memory device 415 may include mappings between virtual addresses and physical addresses of the second memory device 415. Thus the second memory device 415 may not need to perform (or store information associated with) address translations for other memory devices.

At 450, the second memory device 415 may perform an access operation on the physical address of its device memory. In some instances, a controller or processing unit associated with the second memory device 415 may perform the access operation.

At 455, the second memory device 415 may notify a host system associated with the first domain 417 of the access operation. Because the host system may not have been notified of the access operation (e.g., performed at 450), or because the host system may have a modified version of the data associated with the access operation, the data may be recalled from the host system. That is, the host system may be notified to recall the data (e.g., to retrieve the data from the second memory device 415 or return a modified version of the data to the second memory device 415). For example, the host system may be notified to recall the data based on a type of access operation being performed (e.g., a write operation).

At 460, the first memory device 405 may generate a data packet (e.g., a second data packet). In some cases, generating the data packet may include identifying a virtual address space (e.g., as described above at 430). In some examples, the data packet may include one or more of the fields illustrated by the block diagram 300 as described with reference to FIG. 3. In some instances, a controller or processing unit associated with the first memory device 405 may generate the data packet. For exemplary purposes only, the first memory device 405 may generate at least the Destination ID and address fields such that the data packet can be routed to the desired destination memory device.

At 465, the first memory device 405 may transmit the data packet to a destination memory device. As described herein, the destination memory device may be indicated by the Destination ID field included in the data packet. In some instances, a controller or processing unit associated with the first memory device 405 may transmit the data packet. For exemplary purposes only, the Destination ID field of the data packet may include a value (e.g., bit value) that indicates the third memory device 425 as the destination memory device. In some instances, the switch 410 may include logic that identifies whether to route the data packet to another switch (e.g., switch 420) and/or another domain (e.g., second 535 domain 427) or whether the data packet is associated with a memory device included in the same domain. As illustrated in FIG. 4, the switch 410 may determine that the destination ID is associated with the second domain 427 and may route the data packet to the second domain via the switch 420.

In some examples, the second domain 427 may include a switch (not shown). The switch may include logic to determine which memory device to route the data packet to. For example, the switch may include a plurality of output ports that are each associated with a range of addresses of the shared virtual address space. The switch may compare the address included in the data packet to the range of addresses to determine which memory device to route the data packet to and may route the data packet to the third memory device 425.

At 470, the third memory device 425 may determine a physical address of its device memory that is associated with the virtual address included in the data packet. In some instances, a controller or processing unit associated with the third memory device 425 may determine the physical address. The third memory device 425 may include a table (e.g., a mapping table) or other logic configured to map the received virtual address to a physical address of its device memory.

In some instances, the table may include information regarding logical devices associated with the third memory device 425, such that if the data packet includes a Requestor LDID field 355 or a Destination LDID field 360, the second memory device 415 may determine the physical address associated with a particular logical device. Additionally or alternatively, the table may include information regarding mappings between processes and physical addresses, such that if the data packet includes a SASID field, the second memory device 415 may determine the physical address associated with a particular process. However, as described herein, the table used by the third memory device 425 may include mappings between virtual addresses and physical addresses of the second memory device 415. Thus the third memory device 425 may not need to perform (or store information associated with) address translations for other memory devices.

At 475, the third memory device 425 may perform an access operation on the physical address of its device memory. In some instances, a controller or processing unit associated with the third memory device 425 may perform the access operation.

At 480, the third memory device 425 may notify a host system associated with the second domain 427 of the access operation. Because the host system may not have been notified of the access operation (e.g., performed at 475), or because the host system may have a modified version of the data associated with the access operation, the host system may be notified to resolve coherency. Accordingly, the host system may be notified to recall the data (e.g., to retrieve or send a modified version of the data). By transmitting data packets from device-to-device as described with reference to FIG. 4, a shared virtual address space may exist across a system. The shared virtual address space may provide the associated system with added flexibility for handling memory access requests, while reducing latency that would otherwise be incurred during an access operation due to involvement by a respective host system.

Figure 5:
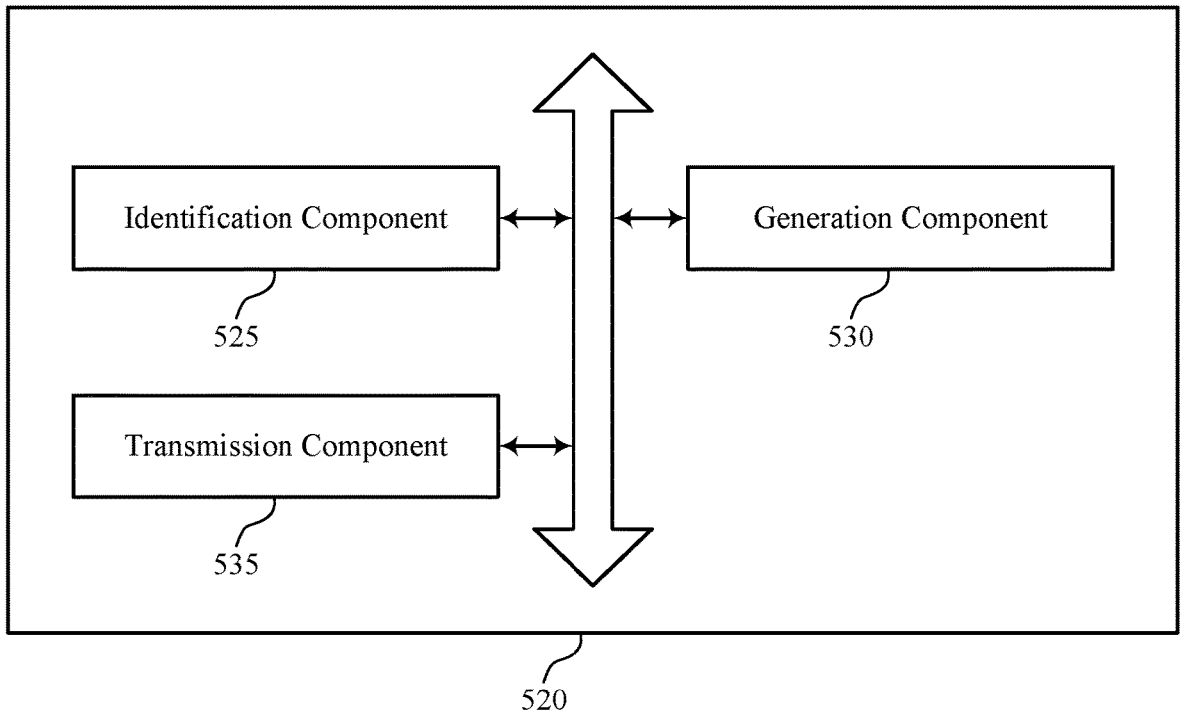
FIGS. 5 through 7 show block diagrams of memory devices that support virtual addresses for a memory system in accordance with examples as disclosed herein.

FIG. 5 shows a block diagram 500 of a memory device 520 that supports virtual addresses for a memory system in accordance with examples as disclosed herein. The memory device 520 may be an example of aspects of a memory device as described with reference to FIGS. 1 through 4. The memory device 520, or various components thereof, may be an example of means for performing various aspects of virtual addresses for a memory system as described herein. For example, the memory device 520 may include an identification component 525, a generation component 530, a transmission component 535, or any combination thereof. Each of these components may communicate, directly or indirectly, with one another (e.g., via one or more buses).

The identification component 525 may be configured as or otherwise support a means for identifying, at a first memory device, a virtual address space associated with a plurality of memory devices, where the plurality of memory devices is associated with one or more host domains, and where each of the one or more host domains are associated with a respective host device.

The generation component 530 may be configured as or otherwise support a means for generating a data packet including a first field and a second field, where the first field includes an identifier associated with a second memory device of the plurality of memory devices that is associated with a range of the virtual address space, and the second field includes an address within the range of the virtual address space associated with the second memory device. In some examples, to support generating the data packet, the generation component 530 may be configured as or otherwise support a means for generating a third field that includes a second address that is associated with a logical device of the second memory device, where the second memory device includes a plurality of logical devices.

In some examples, to support generating the data packet, the generation component 530 may be configured as or otherwise support a means for generating a fourth field that includes an identifier of a shared address space associated with the virtual address space, where the address is associated with the shared address space. In some examples, to support generating the data packet, the generation component 530 may be configured as or otherwise support a means for generating, based at least in part on determining that the second memory device is associated with a second host domain, a fifth field that includes a portion of the address for the virtual address space.

The transmission component 535 may be configured as or otherwise support a means for transmitting, from the first memory device to the second memory device, the data packet based at least in part on the identifier. In some examples, to support transmitting the data packet to the second memory device, the transmission component 535 may be configured as or otherwise support a means for transmitting the data packet from the first memory device to the second memory device via a first switch, where the first switch forwards the data packet from the first memory device to the second memory device based at least in part on the identifier.

In some examples, the first switch forwards the data packet from a first host domain including the first memory device to a second host domain including the second memory device. In some examples, the first memory device, the second memory device, and the first switch are located within a same host domain. In some examples, the plurality of memory devices are associated with a plurality of host domains. In some examples, each of the plurality of memory devices is associated with a unique identifier addressable by the first field.

Figure 6:
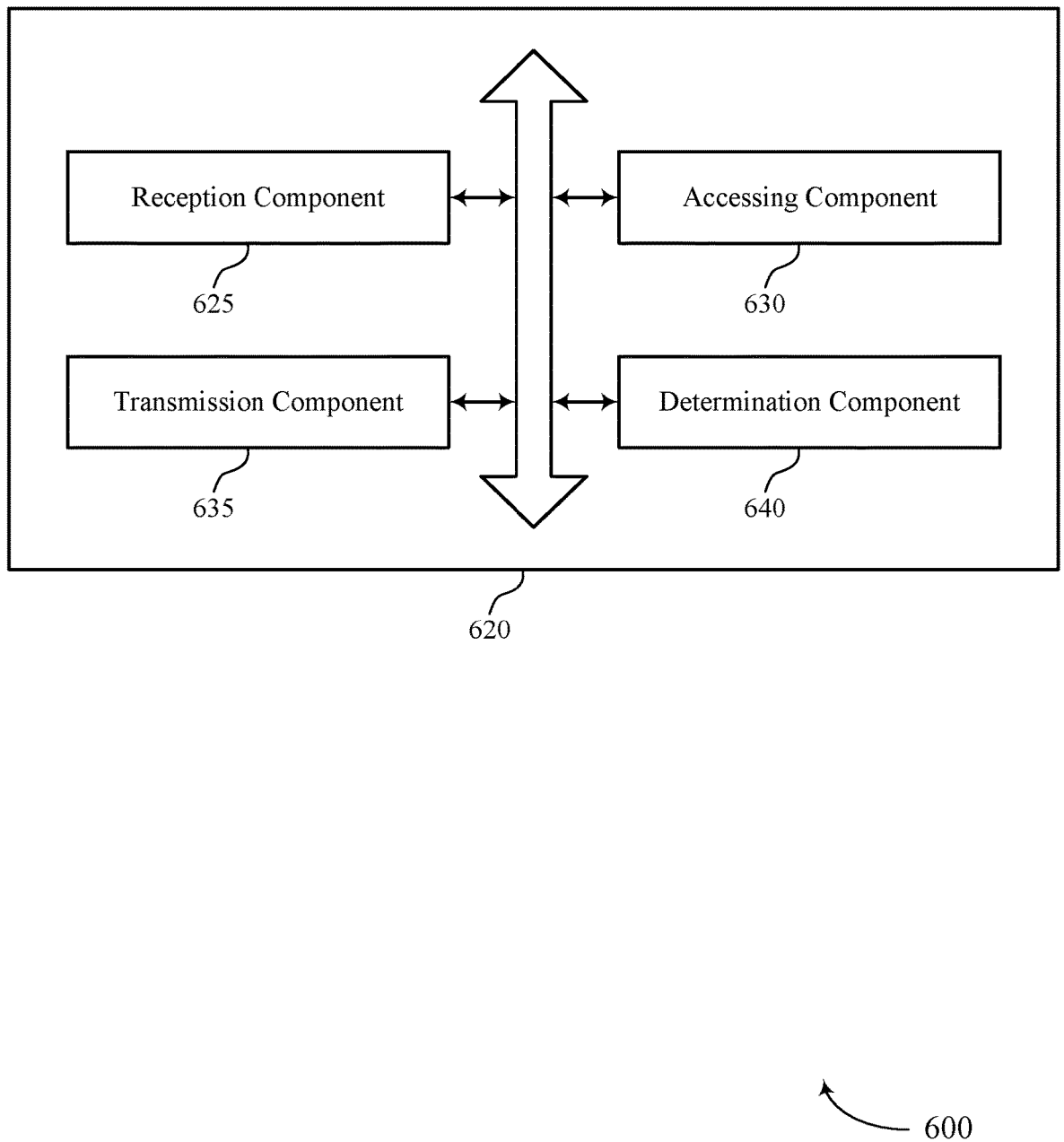

FIG. 6 shows a block diagram 600 of a memory device 620 that supports virtual addresses for a memory system in accordance with examples as disclosed herein. The memory device 620 may be an example of aspects of a memory device as described with reference to FIGS. 1 through 4. The memory device 620, or various components thereof, may be an example of means for performing various aspects of virtual addresses for a memory system as described herein. For example, the memory device 620 may include a reception component 625, an accessing component 630, a transmission component 635, a determination component 640, or any combination thereof. Each of these components may communicate, directly or indirectly, with one another (e.g., via one or more buses).

The reception component 625 may be configured as or otherwise support a means for receiving, at a first memory device, a data packet from a second memory device, where the data packet includes a first field that includes an identifier associated with the first memory device and a second field that includes a virtual address within a range of virtual addresses associated with the first memory device. In some examples, the reception component 625 may be configured as or otherwise support a means for receiving, via a second switch, the data packet based at least in part on identifying the first memory device. In some examples, the reception component 625 may be configured as or otherwise support a means for receiving, from the second memory device via a first switch, the data packet based at least in part on identifying the first memory device.

The accessing component 630 may be configured as or otherwise support a means for performing, by the first memory device, an access operation on data associated with a physical address based at least in part on determining, at the first memory device, the physical address of the first memory device associated with the virtual address. In some examples, the data packet includes a third field that includes a second address that is associated with a logical device of the first memory device, and the accessing component 630 may be configured as or otherwise support a means for accessing, by the first memory device, data associated with the physical address that is included in the logical device based at least in part on determining the logical device of the first memory device.

The transmission component 635 may be configured as or otherwise support a means for transmitting, to a host device associated with the first memory device, an indication to recall the data from a portion of the host device based at least in part on accessing the data and determining the physical address of the first memory device.

In some examples, the data packet includes a third field that includes a second address that is associated with a logical device of the first memory device, and the determination component 640 may be configured as or otherwise support a means for determining, at the first memory device, the logical device based at least in part on the second address. In some examples, the determination component 640 may be configured as or otherwise support a means for determining, at the first memory device, the physical address of the first memory device associated with the virtual address based at least in part on a process associated with the virtual address, wherein the process associated with the virtual address is based at least in part on a fourth field of the data packet that includes an indication of a shared address space identifier associated with the virtual address space and a mapping, for a host domain comprising the first memory device, between the indication of the shared address space identifier and the virtual address space comprising the range of virtual addresses.

In some examples, the first memory device and the second memory device are located within different host domains. In some examples, the first memory device is associated with a first host domain of a plurality of host domains and the second memory device is associated with a second host domain of the plurality of host domains.

Figure 7:
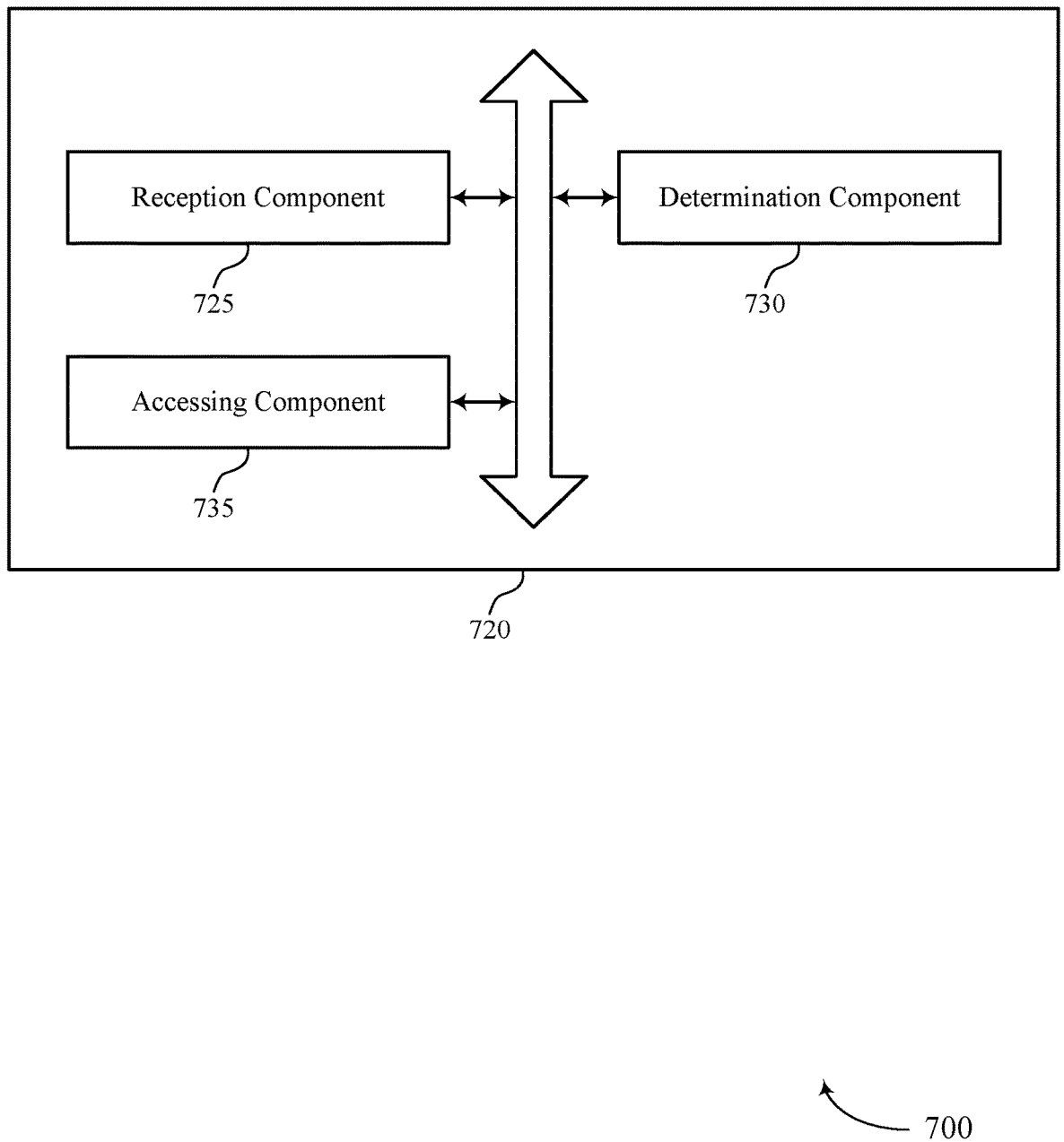

FIG. 7 shows a block diagram 700 of a memory device 720 that supports virtual addresses for a memory system in accordance with examples as disclosed herein. The memory device 720 may be an example of aspects of a memory device as described with reference to FIGS. 1 through 4. The memory device 720, or various components thereof, may be an example of means for performing various aspects of virtual addresses for a memory system as described herein. For example, the memory device 720 may include a reception component 725, a determination component 730, an accessing component 735, or any combination thereof. Each of these components may communicate, directly or indirectly, with one another (e.g., via one or more buses).

The reception component 725 may be configured as or otherwise support a means for receiving, at a first memory device, a data packet from a second memory device based at least in part on a first field and a second field included in the data packet, where the first field includes an indication of one or more processes associated with the first memory device and the second field includes an address associated with a range of virtual addresses associated with the first memory device.

The determination component 730 may be configured as or otherwise support a means for determining, at the first memory device, a physical address of the first memory device based at least in part on the indication of the one or more processes associated with the first memory device and the address.

The accessing component 735 may be configured as or otherwise support a means for accessing, by the first memory device, data associated with the physical address based at least in part on determining the physical address of the first memory device.

Figure 8:
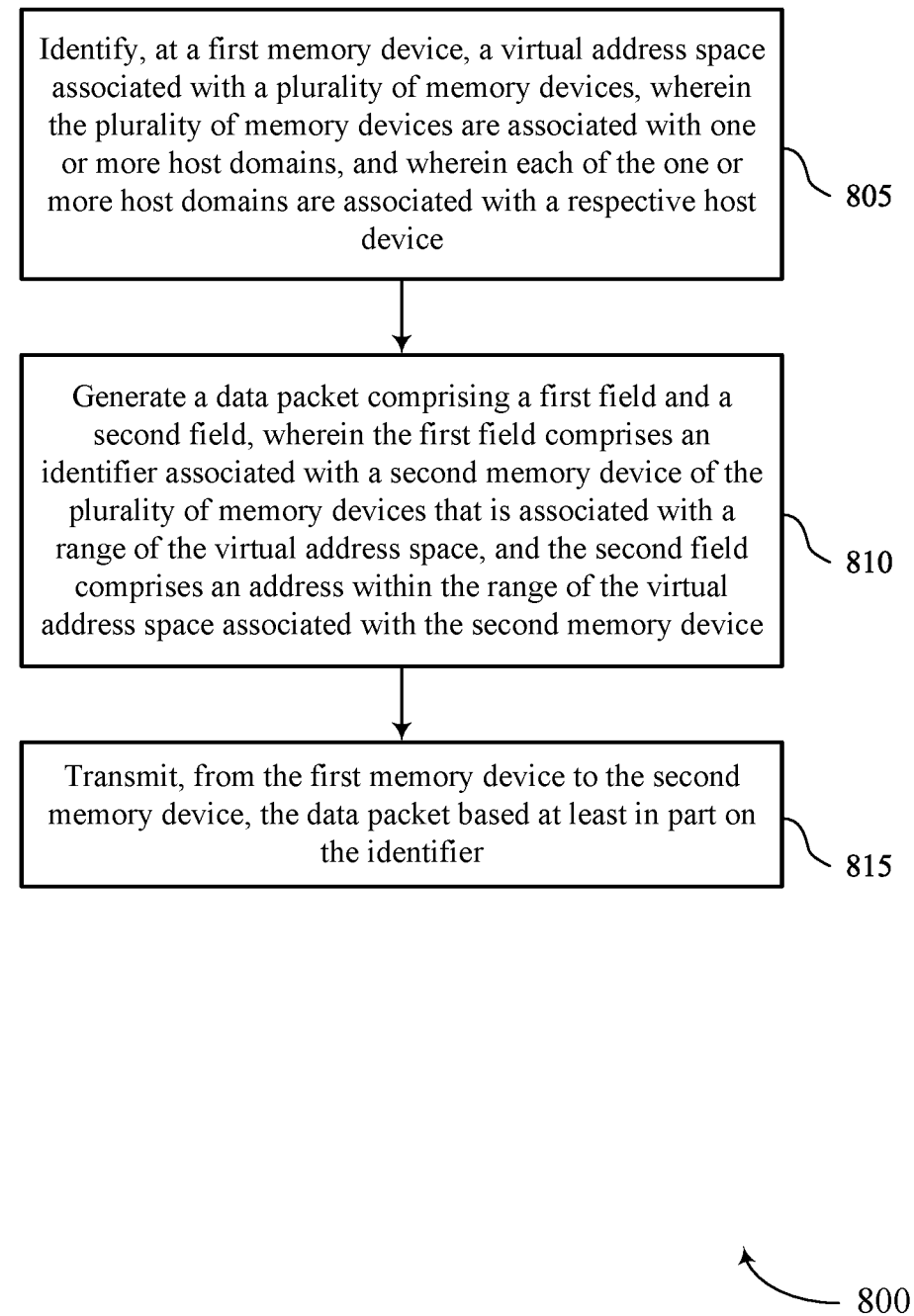
FIGS. 8 through 10 show flowcharts illustrating a method or methods that support virtual addresses for a memory system in accordance with examples as disclosed herein.

FIG. 8 shows a flowchart illustrating a method 800 that supports virtual addresses for a memory system in accordance with examples as disclosed herein. The operations of method 800 may be implemented by a memory device or its components as described herein. For example, the operations of method 800 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 805, the method may include identifying, at a first memory device, a virtual address space associated with a plurality of memory devices, where the plurality of memory devices is associated with one or more host domains, and where each of the one or more host domains are associated with a respective host device. The operations of 805 may be performed in accordance with examples as disclosed herein. In some examples, aspects of the operations of 805 may be performed by an identification component 525 as described with reference to FIG. 5.

At 810, the method may include generating a data packet including a first field and a second field, where the first field includes an identifier associated with a second memory device of the plurality of memory devices that is associated with a range of the virtual address space, and the second field includes an address within the range of the virtual address space associated with the second memory device. The operations of 810 may be performed in accordance with examples as disclosed herein. In some examples, aspects of the operations of 810 may be performed by a generation component 530 as described with reference to FIG. 5.

At 815, the method may include transmitting, from the first memory device to the second memory device, the data packet based at least in part on the identifier. The operations of 815 may be performed in accordance with examples as disclosed herein. In some examples, aspects of the operations of 815 may be performed by a transmission component 535 as described with reference to FIG. 5.

In some examples, an apparatus as described herein may perform a method or methods, such as the method 800. The apparatus may include, features, circuitry, logic, means, or instructions (e.g., a non-transitory computer-readable medium storing instructions executable by a processor) for identifying, at a first memory device, a virtual address space associated with a plurality of memory devices, where the plurality of memory devices is associated with one or more host domains, and where each of the one or more host domains are associated with a respective host device, generating a data packet including a first field and a second field, where the first field includes an identifier associated with a second memory device of the plurality of memory devices that is associated with a range of the virtual address space, and the second field includes an address within the range of the virtual address space associated with the second memory device, and transmitting, from the first memory device to the second memory device, the data packet based at least in part on the identifier.

In some examples of the method 800 and the apparatus described herein, transmitting the data packet to the second memory device may include operations, features, circuitry, logic, means, or instructions for transmitting the data packet from the first memory device to the second memory device via a first switch, where the first switch forwards the data packet from the first memory device to the second memory device based at least in part on the identifier.

In some examples of the method 800 and the apparatus described herein, the first switch forwards the data packet from a first host domain including the first memory device to a second host domain including the second memory device.

In some examples of the method 800 and the apparatus described herein, the first memory device, the second memory device, and the first switch may be located within a same host domain.

In some examples of the method 800 and the apparatus described herein, generating the data packet may include operations, features, circuitry, logic, means, or instructions for generating a third field that includes a second address that may be associated with a logical device of the second memory device, where the second memory device includes a plurality of logical devices.

In some examples of the method 800 and the apparatus described herein, the plurality of memory devices may be associated with a plurality of host domains, and each of the plurality of memory devices may be associated with a unique identifier addressable by the first field.

In some examples of the method 800 and the apparatus described herein, generating the data packet may include operations, features, circuitry, logic, means, or instructions for generating a fourth field that includes an identifier of a shared address space associated with the virtual address space, where the address may be associated with the shared address space.

In some examples of the method 800 and the apparatus described herein, generating the data packet may include operations, features, circuitry, logic, means, or instructions for generating, based at least in part on determining that the second memory device may be associated with a second host domain, a fifth field that includes a portion of the address for the virtual address space.

Figure 9:
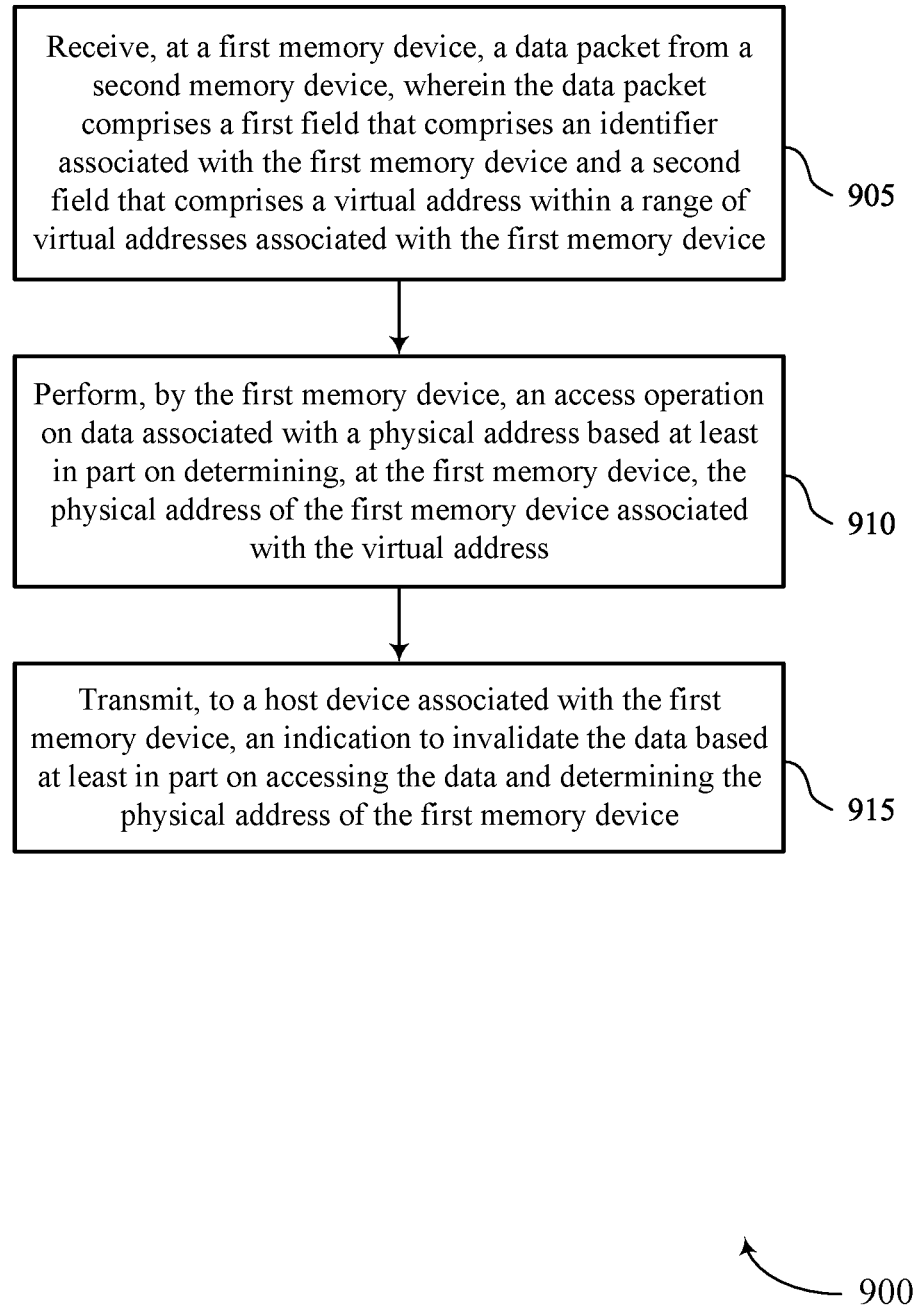

FIG. 9 shows a flowchart illustrating a method 900 that supports virtual addresses for a memory system in accordance with examples as disclosed herein. The operations of method 900 may be implemented by a memory device or its components as described herein. For example, the operations of method 900 may be performed by a memory device as described with reference to FIGS. 1 through 4 and 6. In some examples, a memory device may execute a set of instructions to control the functional elements of the device to perform the described functions. Additionally or alternatively, the memory device may perform aspects of the described functions using special-purpose hardware.

At 905, the method may include receiving, at a first memory device, a data packet from a second memory device, where the data packet includes a first field that includes an identifier associated with the first memory device and a second field that includes a virtual address within a range of virtual addresses associated with the first memory device. The operations of 905 may be performed in accordance with examples as disclosed herein. In some examples, aspects of the operations of 905 may be performed by a reception component 625 as described with reference to FIG. 6.

At 910, the method may include performing, by the first memory device, an access operation on data associated with a physical address based at least in part on determining, at the first memory device, the physical address of the first memory device associated with the virtual address. The operations of 910 may be performed in accordance with examples as disclosed herein. In some examples, aspects of the operations of 910 may be performed by an accessing component 630 as described with reference to FIG. 6.

At 915, the method may include transmitting, to a host device associated with the first memory device, an indication to recall the data from a portion of the host device based at least in part on accessing the data and determining the physical address of the first memory device. The operations of 915 may be performed in accordance with examples as disclosed herein. In some examples, aspects of the operations of 915 may be performed by a transmission component 635 as described with reference to FIG. 6.

In some examples, an apparatus as described herein may perform a method or methods, such as the method 900. The apparatus may include, features, circuitry, logic, means, or instructions (e.g., a non-transitory computer-readable medium storing instructions executable by a processor) for receiving, at a first memory device, a data packet from a second memory device, where the data packet includes a first field that includes an identifier associated with the first memory device and a second field that includes a virtual address within a range of virtual addresses associated with the first memory device, performing, by the first memory device, an access operation on data associated with a physical address based at least in part on determining, at the first memory device, the physical address of the first memory device associated with the virtual address, and transmitting, to a host device associated with the first memory device, an indication to recall the data from a portion of the host device based at least in part on accessing the data and determining the physical address of the first memory device.

Some examples of the method 900 and the apparatus described herein may further include operations, features, circuitry, logic, means, or instructions for receiving, from the second memory device via a first switch, the data packet based at least in part on identifying the first memory device.

In some examples of the method 900 and the apparatus described herein, the data packet includes a third field that includes a second address that may be associated with a logical device of the first memory device and the method, apparatuses, and non-transitory computer-readable medium may include further operations, features, circuitry, logic, means, or instructions for determining, at the first memory device, the logical device based at least in part on the second address and accessing, by the first memory device, data associated with the physical address that may be included in the logical device based at least in part on determining the logical device of the first memory device.

Some examples of the method 900 and the apparatus described herein may further include operations, features, circuitry, logic, means, or instructions for receiving, via a second switch, the data packet based at least in part on identifying the first memory device.

In some examples of the method 900 and the apparatus described herein, the first memory device and the second memory device are located within different host domains.

In some examples of the method 900 and the apparatus described herein, the first memory device may be associated with a first host domain of a plurality of host domains and the second memory device may be associated with a second host domain of the plurality of host domains.

Some examples of the method 900 and the apparatus described herein may further include operations, features, circuitry, logic, means, or instructions for determining, at the first memory device, the physical address of the first memory device associated with the virtual address based at least in part on a process associated with the virtual address, wherein the process associated with the virtual address is based at least in part on a fourth field of the data packet that includes an indication of a shared address space identifier associated with the virtual address space and a mapping, for a host domain comprising the first memory device, between the indication of the shared address space identifier and the virtual address space comprising the range of virtual addresses.

Figure 10:
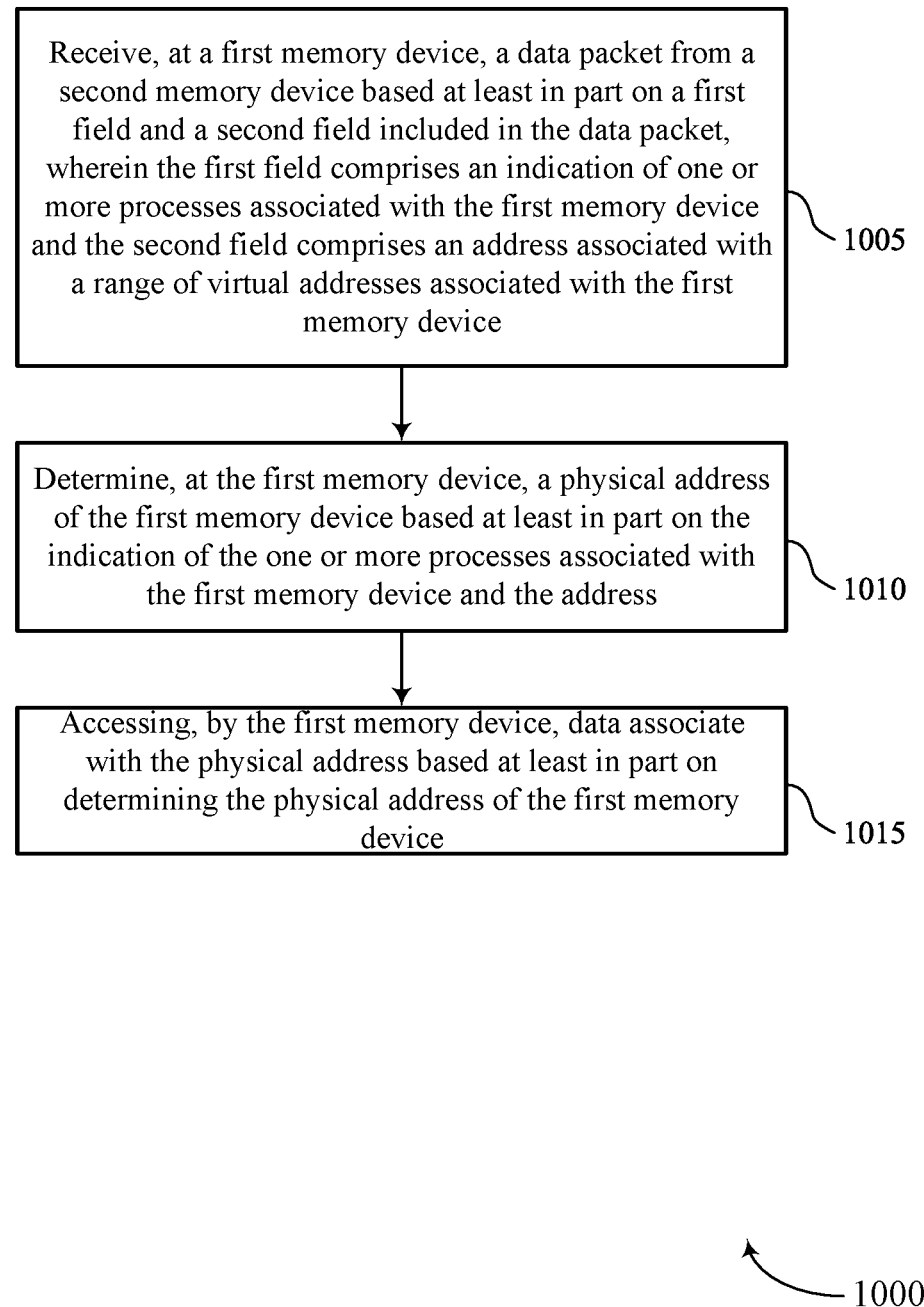

FIG. 10 shows a flowchart illustrating a method 1000 that supports virtual addresses for a memory system in accordance with examples as disclosed herein. The operations of method 1000 may be implemented by a memory device or its components as described herein. For example, the operations of method 1000 may be performed by a memory device as described with reference to FIGS. 1 through 4 and 7. In some examples, a memory device may execute a set of instructions to control the functional elements of the device to perform the described functions. Additionally or alternatively, the memory device may perform aspects of the described functions using special-purpose hardware.

At 1005, the method may include receiving, at a first memory device, a data packet from a second memory device based at least in part on a first field and a second field included in the data packet, where the first field includes an indication of one or more processes associated with the first memory device and the second field includes an address associated with a range of virtual addresses associated with the first memory device. The operations of 1005 may be performed in accordance with examples as disclosed herein. In some examples, aspects of the operations of 1005 may be performed by a reception component 725 as described with reference to FIG. 7.

At 1010, the method may include determining, at the first memory device, a physical address of the first memory device based at least in part on the indication of the one or more processes associated with the first memory device and the address. The operations of 1010 may be performed in accordance with examples as disclosed herein. In some examples, aspects of the operations of 1010 may be performed by a determination component 730 as described with reference to FIG. 7.

At 1015, the method may include accessing, by the first memory device, data associated with the physical address based at least in part on determining the physical address of the first memory device. The operations of 1015 may be performed in accordance with examples as disclosed herein. In some examples, aspects of the operations of 1015 may be performed by an accessing component 735 as described with reference to FIG. 7.

In some examples, an apparatus as described herein may perform a method or methods, such as the method 1000. The apparatus may include, features, circuitry, logic, means, or instructions (e.g., a non-transitory computer-readable medium storing instructions executable by a processor) for receiving, at a first memory device, a data packet from a second memory device based at least in part on a first field and a second field included in the data packet, where the first field includes an indication of one or more processes associated with the first memory device and the second field includes an address associated with a range of virtual addresses associated with the first memory device, determining, at the first memory device, a physical address of the first memory device based at least in part on the indication of the one or more processes associated with the first memory device and the address, and accessing, by the first memory device, data associated with the physical address based at least in part on determining the physical address of the first memory device.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if" "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. A method, comprising:
  identifying, at a first memory device, a virtual address space associated with a plurality of memory devices, wherein the plurality of memory devices is associated with one or more host domains, and wherein each of the one or more host domains are associated with a respective host device;

generating, at the first memory device, a data packet comprising a first field and a second field, wherein the first field comprises an identifier associated with a second memory device of the plurality of memory devices, wherein the second memory device is associated with a range of the virtual address space, and wherein the second field comprises an address within the range of the virtual address space associated with the second memory device; and transmitting, from the first memory device to the second memory device, the data packet based at least in part on the identifier.

2. The method of claim 1, wherein transmitting the data packet to the second memory device comprises:
transmitting the data packet from the first memory device to the second memory device via a first switch, wherein the first switch forwards the data packet from the first memory device to the second memory device based at least in part on the identifier.

3. The method of claim 2, wherein the first switch forwards the data packet from a first host domain comprising the first memory device to a second host domain comprising the second memory device.

4. The method of claim 2, wherein the first memory device, the second memory device, and the first switch are located within a same host domain.

5. The method of claim 1, wherein generating the data packet comprises:
generating a third field that comprises a second address that is associated with a logical device of the second memory device, wherein the second memory device comprises a plurality of logical devices.

6. The method of claim 1, wherein the plurality of memory devices is associated with a plurality of host domains, and wherein each of the plurality of memory devices is associated with a unique identifier addressable by the first field.

7. The method of claim 1, wherein generating the data packet comprises:
generating a fourth field that comprises an identifier of a shared address space associated with the virtual address space, wherein the address is associated with the shared address space.

8. The method of claim 1, wherein the first memory device is associated with a first host domain, and wherein generating the data packet comprises:
generating, based at least in part on determining that the second memory device is associated with a second host domain, a fifth field that comprises a portion of the address for the virtual address space.

9. A memory system, comprising:
one or more memory devices; and
processing circuitry coupled with the one or more memory devices and configured to cause the memory system to:
identify, at a first memory device of the one or more memory devices, a virtual address space associated with the one or more memory devices, wherein the one or more memory devices is associated with one or more host domains, and wherein each host domain is associated with a respective host device;

generate, at the first memory device, a data packet comprising a first field and a second field, wherein the first field comprises an identifier associated with a second memory device of the one or more memory devices, wherein the second memory device is associated with a range of the virtual address space, and wherein the second field comprises an address within the range of the virtual address space associated with the second memory device; and transmit, from the first memory device to the second memory device, the data packet based at least in part on the identifier.

10. The memory system of claim 9, wherein the processing circuitry is further configured to transmit the data packet to the second memory device by:
transmitting the data packet from the first memory device to the second memory device via a first switch, wherein the first switch forwards the data packet from the first memory device to the second memory device based at least in part on the identifier.

11. The memory system of claim 10, wherein the first switch forwards the data packet from a first host domain comprising the first memory device to a second host domain comprising the second memory device.

12. The memory system of claim 10, wherein the first memory device and the second memory device are located within a same host domain.

13. The memory system of claim 9, wherein the processing circuitry is configured to generate the data packet by:
generating a third field that comprises a second address that is associated with a logical device of the second memory device, wherein the second memory device comprises a plurality of logical devices.

14. The memory system of claim 9, and wherein each of the one or more memory devices is associated with a unique identifier addressable by the first field.

15. The memory system of claim 9, wherein the processing circuitry is configured to generate the data packet by:
generating a fourth field that comprises an identifier of a shared address space associated with the virtual address space, wherein the address is associated with the shared address space.

16. The memory system of claim 15, wherein the first memory device are associated with a first host domain, and wherein the processing circuitry is configured to generate the data packet by:
generating, based at least in part on determining that the second memory device are associated with a second host domain, a fifth field that comprises a portion of the address for the virtual address space.

* * * * *